United States Patent [19]

Janutta

[11] Patent Number: 4,836,518
[45] Date of Patent: Jun. 6, 1989

[54] FIXTURE FOR WORKPIECES

[75] Inventor: Reinhard Janutta, Geesthacht, Fed. Rep. of Germany

[73] Assignee: Körber AG, Hamburg, Fed. Rep. of Germany

[21] Appl. No.: 106,378

[22] Filed: Oct. 6, 1987

[30] Foreign Application Priority Data

Oct. 8, 1986 [DE] Fed. Rep. of Germany ....... 3634268

[51] Int. Cl.$^4$ ............................................. B23Q 1/04
[52] U.S. Cl. ......................................... 269/43; 269/37
[58] Field of Search ............................ 29/281.1, 527.5;
228/49.1; 269/37, 43, 289 R, 296

[56] References Cited

U.S. PATENT DOCUMENTS

3,414,958 12/1968 Anderson ............................. 269/37
4,541,619 9/1985 Herman .................................. 269/43

Primary Examiner—Steven Mottola
Attorney, Agent, or Firm—Peter K. Kontler

[57] ABSTRACT

A fixture for workpieces which cannot be directly engaged by the work holder of a machine tool has a pallet for several work holding elements each of which has a head releasably engaging a workpiece and a section which is embedded in hardened casting material of the pallet so that the casting material does not contact the workpieces. The pallet can be a one-piece casting or is assembled of several reusable modules, and it has several mounting surfaces which facilitate predictable mounting in the work holder of a machine tool.

24 Claims, 8 Drawing Sheets

FIXTURE FOR WORKPIECES

CROSS-REFERENCE TO RELATED CASES

The assignee of the present application is the owner of copending patent application Ser. No. 045,247 filed Apr. 20, 1987 by Heinrich Mushardt et al. for "Cast fixture for holding composite workpieces", now U.S. Pat. No. 4,737,417 granted Apr. 12, 1988. The assignee of the present application also owns copending patent application Ser. No. 638,886 filed Aug. 8, 1984 by Ulrich Wendt for "Method and apparatus for separating cast or extruded blocks from workpieces", the copending patent application Ser. No. 914,813 filed Oct. 3, 1986 by Heinrich Mushardt et al. for "Fixture for workpieces, particularly turbine blades", and the copending patent application Ser. No. 074,925 filed July 17, 1987 by Heinrich Mushardt for "Method of grinding arcuate surfaces of workpieces". Furthermore, the assignee of the present application owns German Offenlegungsschrift No. 33 40 785.1 filed Nov. 11, 1983 by Ulrich Wendt which corresponds to United States patent application Ser. No. 666,364, filed Oct. 30, 1984 and now abandoned.

BACKGROUND OF THE INVENTION

The invention relates to fixtures for workpieces, especially for complex workpieces which cannot be readily installed in and properly held by standard work holders of machine tools, such as grinding machines. Typical examples of workpieces which cannot be readily mounted in a grinding machine are portions of compressors and turbines, such as guide vanes, blades and similar parts.

It is well known that special fixtures must be designed to properly hold certain complex workpieces in various types of machine tools. In many instances, the configuration of a workpiece is so complex that the workpiece cannot be properly engaged by the customary work holding means of a machine tool. Moreover, it is often desirable to avoid pronounced clamping engagement between a workpiece and a work holder while a selected portion of the workpiece is being treated by a material removing tool. Still further, many workpieces are configured in such a way that they do not present relatively large surfaces which can be properly engaged by a work holder. In all such instances, proper treatment of workpieces in a machine tool (such as a milling or grinding machine) invariably necessitates the provision of specially designed fixtures which can be brought into requisite supporting, retaining and locating or orienting engagement with one or more workpieces prior to installation of the fixture in a machine tool. As mentioned above, certain parts (especially blades or vanes) of turbines and compressors are typical examples of such workpieces. For example, if the foot, tip or end piece of a guide vane or blade forming part of a turbine or a compressor must be ground in an automatic grinding machine, such workpieces are normally installed in fixtures each of which contacts the blade or vane proper so that the end piece, foot or tip of the workpiece remains exposed and can be treated by one or more material removing tools. In accordance with a prior proposal which is disclosed in commonly owned German Offenlegungsschrift No. 35 35 646, the fixture consists of or includes a casting which surrounds the blade or vane of a turbine or compressor so that the part or parts which require treatment in a machine tool remain exposed. The material of the fixture is hardened and it completely surrounds a selected portion of or the entire vane or blade but leaves exposed all such parts which must be accessible for proper removal of material from the workpiece in a grinding machine or in another machine tool. This simplifies the mounting of the workpiece in a machine tool because the configuration of the fixture can be readily selected in such a way that it is best suited or most satisfactory for proper installation and retention in the machine tool. When the treatment is completed, the fixture is usually destroyed, for example, by melting or by subjecting it to a mechanical comminuting action so that it falls apart into two or more pieces and permits removal of the confined portion of the treated workpiece. Such types of fixtures are quite satisfactory and are extensively used in many machine tools, especially for proper retention of complex and/or highly sensitive workpieces which should not be directly engaged by the work holder or by the work clamping means of a machine tool.

However, the just described fixtures also exhibit certain serious drawbacks. For example, the material of the fixture is in direct contact with the material of the workpiece. If the consistency of the material of the workpiece and/or the consistency of the material of the fixture is such that the cast and subsequently hardened material of the fixture tends to adhere to the workpiece, actual liberation of the workpiece from its fixture must be followed by lengthy and complex cleaning in order to remove all traces of the material of the fixture before the freshly treated and cleaned workpiece can be installed in a turbine, in a compressor or in a like machine.

Another drawback of the just discussed fixtures is that certain types of workpieces consist of or contain a material which reacts with the molten material of the fixture so that the consistency of the material of the workpiece is changed as a result of direct contact with the material of the fixture. This can involve metallurgical, chemical and/or other changes of the material of the workpieces. The likelihood of undesirable reaction is especially pronounced at the time when the material of the fixture in still hot, i.e., when molten material is being poured into a mold which also contains one or more selected portions of a workpieces.

OBJECTS AND SUMMARY OF THE INVENTION

An object of the invention is to provide a novel and improved fixture for certain types of workpieces which cannot be directly engaged by the work holders of machine tools, and to construct the fixture in such a way that the material which is likely to adhere to a workpiece cannot come into direct contact with the workpiece at any stage of treatment including the making or assembling of the fixture, installation of a finished fixture in a machine tool, treatment of the workpiece by one or more tools, and removal and dismantling of the fixture.

Another object of the invention is to provide a fixture which cannot bring about any chemical, metallurgical and/or other undesirable changes in the material of the confined workpiece or workpieces.

A further object of the invention is to provide a fixture which can properly support one, two or more workpieces with the same degree of reliability.

Still another object of the invention is to provide a reusable fixture which can be assembled of prefabricated modules so as to be capable of adequately holding one, two or more workpieces in a grinding machine or in another machine tool.

A further object of the invention is to provide a fixture which can properly support sensitive, complex and/or brittle workpieces with the same degree of reliability.

A further object of the invention is to provide a fixture which exhibits the above outlined advantages and can be mass-produced at a reasonable cost.

Another object of the invention is to provide a fixture which can be used in available machine tools and can properly engage and hold known types of workpieces.

An additional object of the invention is to provide a novel and improved method of locating and confining one or more workpieces in a fixture of the above outlined character.

A further object of the invention is to provide the fixture with novel and improved means for preventing direct contact between one or more workpieces and molten casting material.

Another object of the invention is to provide a novel and improved mold or form the making of the above outlined fixture.

A further object of the invention is to provide a fixture which is constructed and designed in such a way that it allows for convenient, rapid and damage-free liberation of the confined workpiece or workpieces.

Another object of the invention is to provide novel and improved means for expelling workpieces from a fixture of the above outlined character.

One feature of the present invention resides in the provision of a fixture for maintaining workpieces (particularly turbine blades or vanes) in predetermined positions, especially for treatment in machine tools. The fixture comprises a work holding element including a first section or head having work retaining means and a second section, and a support including hardened casting material which at least partially surrounds the second section but is out of contact with the first section and with the workpiece which is held by the work retaining means of the first section.

The support is preferably provided with a plurality of mounting surfaces which are engageable with a machine for the treatment of the workpiece which is being held by the retaining means. Such mounting surfaces can include surfaces which support the properly installed support in a machine tool, which properly orient the support in the machine tool and/or which cooperate with one or more clamping or retaining components of the machine tool in order to maintain the fixture in proper position with reference to the machine tool during removal of material from the workpiece.

The retaining means can include a device for clamping the workpiece to the first section of the work holding element. For example, the retaining means can include means for establishing a form-locking and/or a force-locking connection between the workpiece and the first section of the work holding element. The arrangement may be such that at least a portion of the retaining means is resilient. In addition to or instead of such resiliency of a portion at least of the retaining means, the fixture can comprise at least one elastic cushion which is interposed between the retaining means and the workpiece which is being retained by the retaining means.

In accordance with a presently preferred embodiment, the retaining means of the first section of the holding element comprises a carrier, at least one abutment on the carrier, and means for releasably biasing the workpiece against the abutment. For example, the retaining means can comprise a plurality of (at least two) abutments, and the biasing means can comprise at least one mobile claw which is provided on the carrier and serves to urge a workpiece against the abutments.

Alternatively, the retaining means can comprises a claw, spring-biased lever means for urging the claw against the workpiece on the first section of the work holding element, and auxiliary work retaining means provided on the lever means. The lever means can comprise a plurality of discrete levers, and the auxiliary retaining means can comprise projections which are provided on the levers and are biased against the workpiece which is held by the claw. A portion of each lever can be fixedly embedded in the casting material of the support so that the lever means is immobilized during treatment of the workpiece which is being held by such retaining means.

The support can include or constitute a pallet, and such fixture can further comprise at least one additional work holding element having a first section with work retaining means and a second section which is embedded in the pallet. In accordance with a presently preferred embodiment, the entire pallet can consist of a hardenable casting material. The pallet can include a weakened portion which is disposed intermediate the work holding elements and is readily breakable into discrete parts each supporting a work holding element. This renders it simpler to separate the work holding elements from the corresponding fragments or parts of the pallet. The pallet can be provided with a chamber or cavity for the second sections of the work holding elements, and the casting material is then disposed in the chamber and is hardened in the chamber so as to ensure that the work holding elements cannot move relative to the pallet during removal of material from the workpieces.

Alteratively, the pallet can include a plurality of separable reusable parts or modules, and each such part has at least one cavity for the second section of a work holding element. Such pallet further comprises means for separably connecting its parts or modules to each other. The cavities can constitute discrete conical cavities for the second sections of the work holding elements, and the pallet can further comprise means for expelling casting material and the second sections of the work holding elements form the respective cavities. Such expelling means can be provided regardless of whether the cavities have a conical or other shape, as long as they permit for expulsion of hardened casting material and of second sections of the work holding elements therefrom. For example, the pallet can be provided with a wall which is adjacent the cavities and has holes which communicate with the cavities. The expelling means can include reciprocable expelling members in the form of rams or the like which are movable into or out of or within the holes.

The pallet can be further provided with motion receiving means engageable by a conveyor which serves to transport the fixture along a predetermined path, for example, into and from a machine tool. The motion receiving means can be in the form of teeth or tooth spaces or otherwise configurated recesses or depressions for reception of entraining elements on a suitable conveyor.

The second section of each holding element can be provided with means for enlarging its area of contact with the casting material of the support. For example, such enlarging means can comprise one or more through holes which are provided in the second section of each work holding element and can receive molten casting material so that such material sets in the hole or holes and reliably retains the respective second section or sections in proper position with reference to the pallet.

It is further possible to provide means for locating a workpiece with reference to the retaining means of the work holding element prior to hardening of the casting material. Such locating means can include means for maintaining a plurality of selected portions of a workpiece in predetermined positions with reference to the first section of the respective work holding element prior to engagement of the thus located workpiece by the retaining means. The locating means can be installed in a pallet or in a form or mold in which the casting material is poured, either to form a support or to form a plurality of inserts in a single chamber or in discrete cavities of a pallet.

The novel features which are considered as characteristic of the invention are set forth in particular in the appended claims. The improved fixture itself, however, both as to its construction and the mode of making the same, together with additional features and advantages thereof, will be best understood upon perusal of the following detailed description of certain specific embodiments with reference to the accompanying drawings.

DESCRIPTION OF THE PREFERRED EMBODIMENTS

Figure 1:
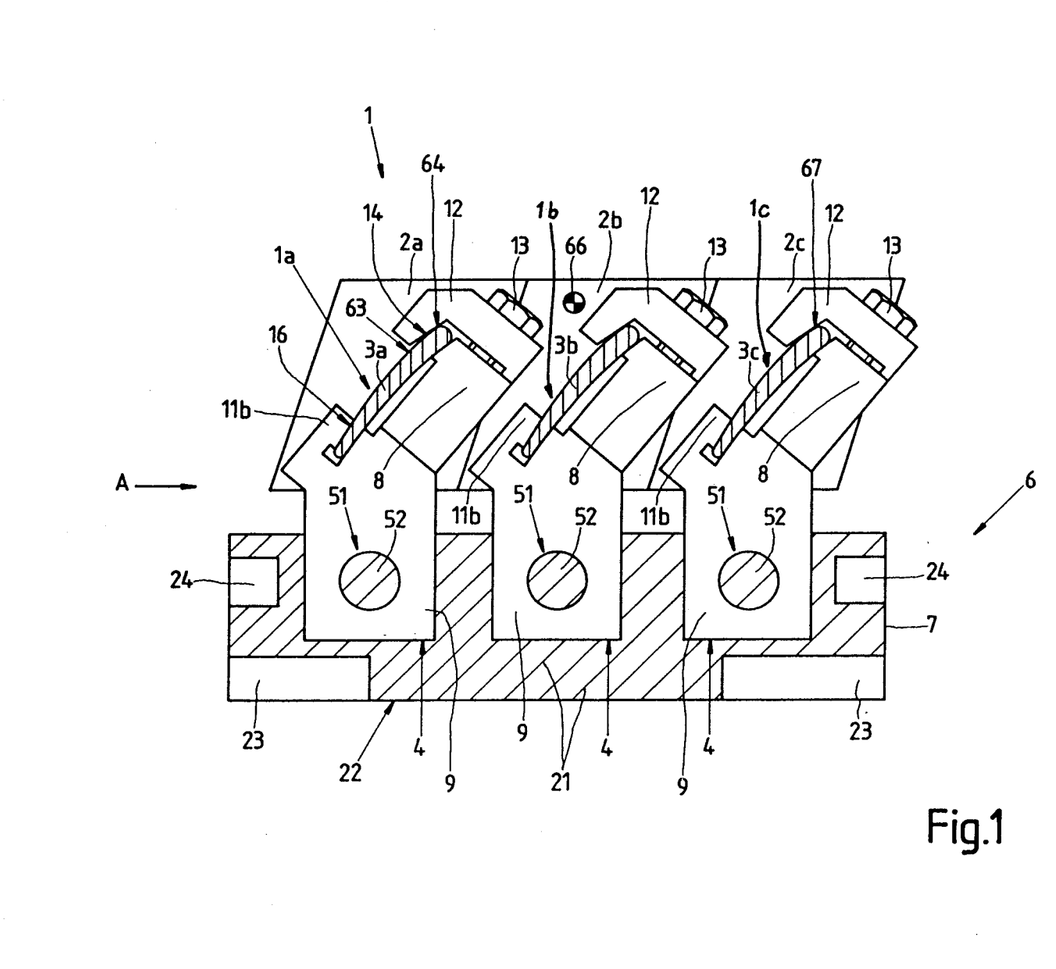
FIG. 1 is vertical sectional view of a fixture which embodies one form of the invention and comprises an one-piece support consisting of a hardened casting material and supporting three work holding elements for turbine blades.

FIG. 1 shows a fixture which embodies one form of the present invention and comprises three identical work holding elements 4 and a one-piece support 6 for the lower or second sections 9 of the three work holding elements. The workpiece 1 which is shown in FIG. 1 is a composite workpiece including three discrete portions of a turbine, namely the portions 1a, 1b and 1c. The portion 1a has a blade or vane proper which is denoted by the character 3a, and two end pieces 2a (see also FIG. 2) which are disposed at opposite ends of the blade or vane 3a. The second portion 1b of the composite workpiece 1 comprises a blade or vane 3b and two end pieces 2b. Analogously, the third portion 1c of the composite workpiece 1 comprises a blade or vane 3c between two end pieces 2c. Only one end piece 2b and only one end piece 2c is actually shown in FIG. 1. The purpose of the fixture which is shown in FIG. 1 is to properly support the blades or vanes 3a, 3b, 3c (hereinafter called blades) so as to facilitate treatment of the end pieces 2a, 2b and 2c in a machine tool, such as a grinding machine. It will be readily appreciated that the illustrated workpiece 1 constitutes but one of numerous types of workpieces which can be properly engaged by the holding elements 4 prior to installation of the improved fixture in a machine tool. For example, the composite workpiece 1 can include portions which constitute component parts of a compressor.

In accordance with a feature of the invention, each of the work holding elements 4 is constructed and assembled in such a way that its upper section or head 8 can releasably engage the respective blade 3a, 3b or 3c but that the workpiece part 1a, 1b or 1c cannot come into contact with the material of the support 6. The support 6 includes a one-piece casting 7 which is formed in a mold or form, such as the mold 53 of FIG. 10, to thus ensure that the material of the workpiece 1 cannot undergo any metallurgical, chemical and/or other change as a result of direct contact with molten material which is thereupon allowed to harden so as to form the casting 7 of the support 6. It will be appreciated that the size of the support 6 can be reduced so that it can carry a single holding element 4 or two holding elements. By the same token, the size of the support 6 can be increased so that it can properly engage and hold four or more properly positioned (preferably aligned) holding elements 4. The illustrated casting 7 can be said to constitute a one-piece pallet which is rigid when in actual use in a machine tool.

Figure 2:
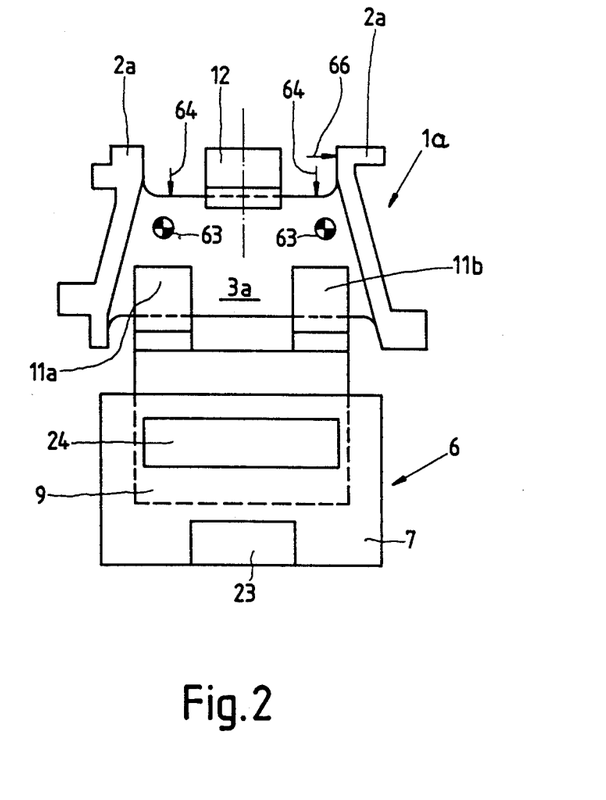
FIG. 2 is an end elevational view of the fixture as seen in the direction of arrow A in FIG. 1.
Figure 3:
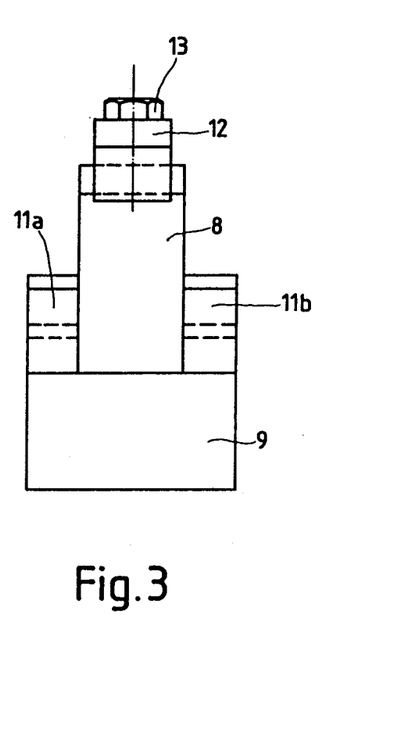
FIG. 3 is a similar elevational view of one of the work holding elements in the fixture of FIG. 1.

Each holding element 4 is provided with means for retaining the respective workpiece part 1a, 1b or 1c in proper position during removal of material from the corresponding end piece or end pieces 2a, 2b or 2c. The retaining means which is shown in FIGS. 1, 2 and 3 comprises a carrier which is the main or central portion of the upper section 8 of the respective holding element 4, and two abutments 11a, 11b (see particularly FIG. 3) at one side of the respective blade 3a, 3b or 3c. Each retaining means further comprises a claw or jaw 12 which is biased against the opposite side of the respective blade 3a, 3b or 3c by one or more screws 13 or similar fasteners which separately connect it to the carrier of the respective upper section 8. Each of the abutments 11a, 11b can be slotted (see FIG. 1) so as to receive the adjacent portion of the corresponding blade before such blade is finally fixed in a desired optimum position by the respective claw 12 in response to tensioning of the associated bolt or bolts 13. The material of the claws 12 is or can be at least slightly elastic so as to ensure an even more reliable retention of the respective blades in optimum positions as determined by the associated abutments 11a, 11b and by the carrier or main portion of the respective first section 8. In addition or in lieu of using an elastic claw 12, each retaining means can comprise one or more resilient cushions (one indicated schematically by the character 14 in FIG. 1) which are interposed between the retaining means and the adjacent portions of the respective blades 3a, 3b, 3c in order to reduce the likelihood of excessive pressurizing of the blades and/or of leaving scratches or marks on the parts 1a, 1b, 1c during treatment as a result of engagement with the corresponding work retaining means. It can be said that each retaining means (including the abutments 11a, 11b, claw 12 and bolt or bolts 13) constitutes a composite clamping device which clamps the selected portion (blade) of the respective workpiece part 1a, 1b or 1c in an optimum position and orientation for treatment of the respective end pieces in a grinding machine or in another machine tool. The clamping jaw or claws 12 can be assembled of or can act not unlike leaf springs so as to yield in response to tensioning of the respective bolt or bolts 13 and to thereby reliably urge the corresponding blades against the adjacent surfaces of the associated retaining means. As mentioned above, one or more elastic cushions 14 can be installed between the claws 12 and the respective blades. Similar or otherwise configured cushions of elastic material can be installed at 16, i.e., in the regions where the blades 3a, 3b, 3c are adjacent the respective abutments 11, 11b. the cushions 14, 16 can be made of rubber or any other suitable elastic material.

The reference character 21 denotes in FIG. 1 the hardened casting material of the pallet 7 of the support 6. This pallet has a supporting surface 22 which is one of several mounting surfaces provided on the pallet and serving to ensure proper mounting of the fixture in a machine tool. The casting material 21 partially surrounds the second or lower sections 9 of the holding elements 4 so that such holding elements are held against any movement relative to the pallet 7 while the latter is being engaged by the work holder of a machine tool in a manner not forming part of the present invention. Additional mounting surfaces of the pallet 7 which is shown in FIG. 1 are those which bound the recesses 23 machined into the locating surface 22. Still further, the pallet 7 is formed with at least two motion receiving portions constituted by surfaces bounding two recesses or tooth spaces 24 which are provided in the end faces of the pallet. Such recesses can receive the teeth or otherwise configured entraining elements of a conveyor (not shown) which can be used to transport the pallet 7 to and/or out of a machine tool. Alternatively, the recesses 24 can serve to receive portions of gripper arms forming part of tongs or like transporting means which are used or can be used to transfer the pallet 7 into or out of a machine tool.

When the treatment of workpiece parts 1a, 1b, 1c in a machine tool is completed, the pallet 7 is caused to release the second sections 9 of the holding elements 4 so that the properly treated workpiece parts 1a–1c can be readily separated from the holding elements. Separation of treated workpiece parts from the respective holding elements 4 can be carried out prior to separation of second sections 9 from the pallet 7. For example, the pallet 7 can be heated so that its casting material 21 melts and thus permits removal of the holding elements 4. Alternatively, the pallet 7 can be subjected to a mechanical comminuting action in a manner as disclosed in the aforementioned commonly owned copending patent application Ser. No. 638,886.

The manner in which the holding elements 4 are properly positioned in the mold 53 so as to ensure that they are confined in the hardened casting material 21 in optimum positions for reception and retention of workpiece parts 1a, 1b, 1c preparatory to and during treatment by the tool or tools of a grinding or other machine will be described with reference to FIG. 10. Such treatment involves proper positioning of holding elements 4 in the cavity or cavities of the mold so as to ensure that the parts 11a, 11b, 12 of each retaining means will engage preselected surface or points of the respective workpiece parts.

Figure 4:
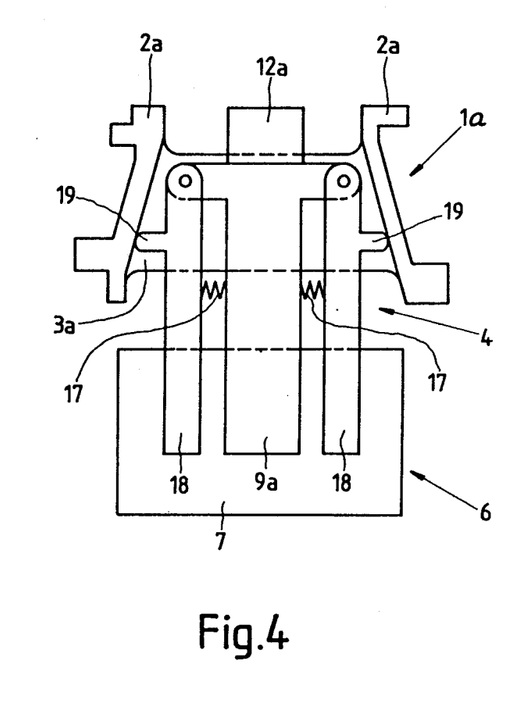
FIG. 4 is a view similar to that of FIG. 2 but showing a modified fixture wherein each work holding element is provided with modified work retaining means.

FIG. 4 shows a modified fixture wherein the work holding elements 4 (only one shown) comprise differently configured retaining means for a composite workpiece which may but need not be identical with the workpiece 1 of FIG. 1. FIG. 4 merely shows the two end pieces 2a and the blade 3a of one part 1a of the composite workpiece. The work retaining means of each work holding element 4 is provided on the upper section of such work holding element and includes two levers 18 which are biased by coil springs 17 so that they tend to maintain their outwardly extending auxiliary retaining portions in the form of projections or studs 19 in engagement with the adjacent inner sides of the respective end pieces 2a of the workpiece part 1a. The retaining means further comprises a claw 12a which can be biased against the workpiece part 1a (namely against the blade 3a) by one or more bolts or similar fasteners corresponding to the fasteners 13 shown in FIG. 1. Alternatively, and as actually shown in FIG. 4, the claw 12a is biased against the blade 3a by the spring-biased levers 18. Once the workpiece part 1a is properly engaged by the projections 19 and claw 12a, the lower portions of the levers 18 are embedded in the casting material of the pallet 7 of the support 6 so that they are immobilized at the respective sides of the second section 9a of the holding element 4 of FIG. 4.

Figure 5:
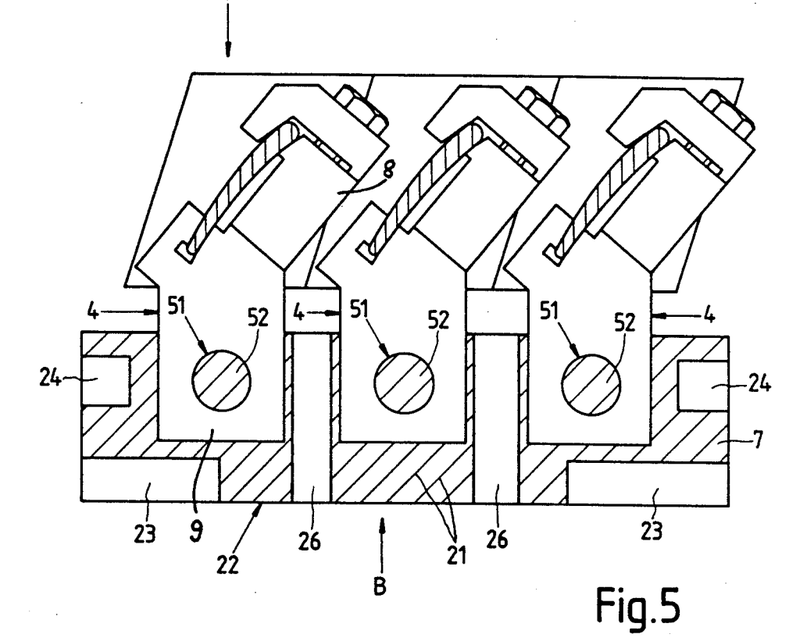
FIG. 5 is a vertical sectional view of a fixture which constitutes a second modification of the fixture of FIG. 1 and wherein the support is provided with weakened portions to facilitate the breaking up of the support into separate parts each of which confines the second section of a discrete work holding element.
Figure 6:
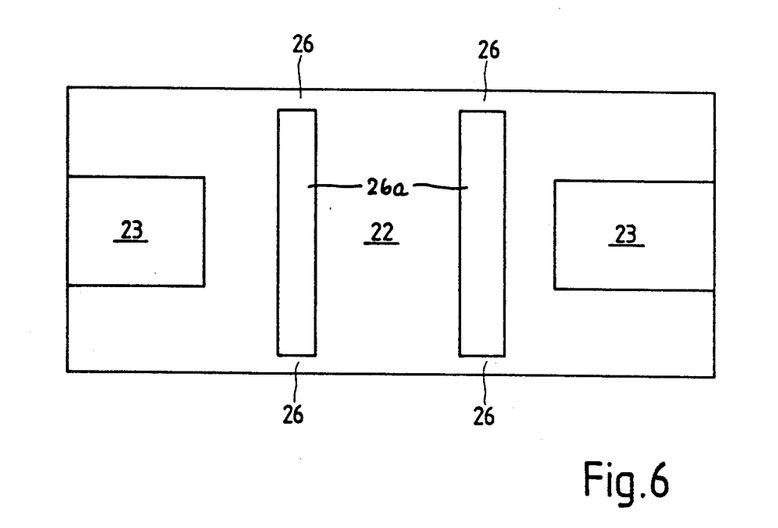
FIG. 6 is a bottom plan view as seen in the direction of arrow B in FIG. 5.

FIGS. 5 and 6 shown a third fixture which comprises a support in the form of a one piece pallet 7 consisting of hardened casting material 21 and having two weakened portions between neighboring work holding elements 4. Each weakened portion includes a recess 26b provided in the bottom surface 22 of the pallet 7 and flanked by two relatively narrow webs (26) which can be readily destroyed (for example, by insertion of a suitable flat tool into the respective recess 26a so that the tool can be turned in order to break the respective webs 26. This entails a subdivision of the one-piece pallet 7 into three discrete parts each of which still confines the second section 9 of the respective work holding element 4. The work retaining means on the first sections 8 of the holding elements 4 shown in FIG. 5 can be identical with those described in connection with FIG. 1. This also applies for the composite workpiece 1. Each second section 9 can be liberated from the corresponding part of the pallet 7 by melting the material 21 or by mechanically breaking up such part with suitable impacting or other instrumentalities, not shown. The parts of the finished workpiece 1 can be separated from the sections 8 of the respective work holding elements 4 prior or subsequent to melting of the corresponding parts of the broken pallet 7.

An advantage which is common to the pallets 7 of FIGS. 1, 4 and 5 is that each such pallet consists of a single piece of hardened casting material 21. This renders it possible to properly finish their mounting surfaces including the surface 22 and surfaces bounding the recesses 23 so that each of these pallet can be installed in a machine tool with a very high degree of precision. All that is necessary is to properly maintain the condition and quality of the corresponding surfaces of the mold 53 or an analogous mold in which such one-piece pallets 7 are made. On the other hand, the one-piece pallets 7 are not reusable except in a sense that their material 21 can be molten and reused for the making of fresh pallets.

Figure 7:
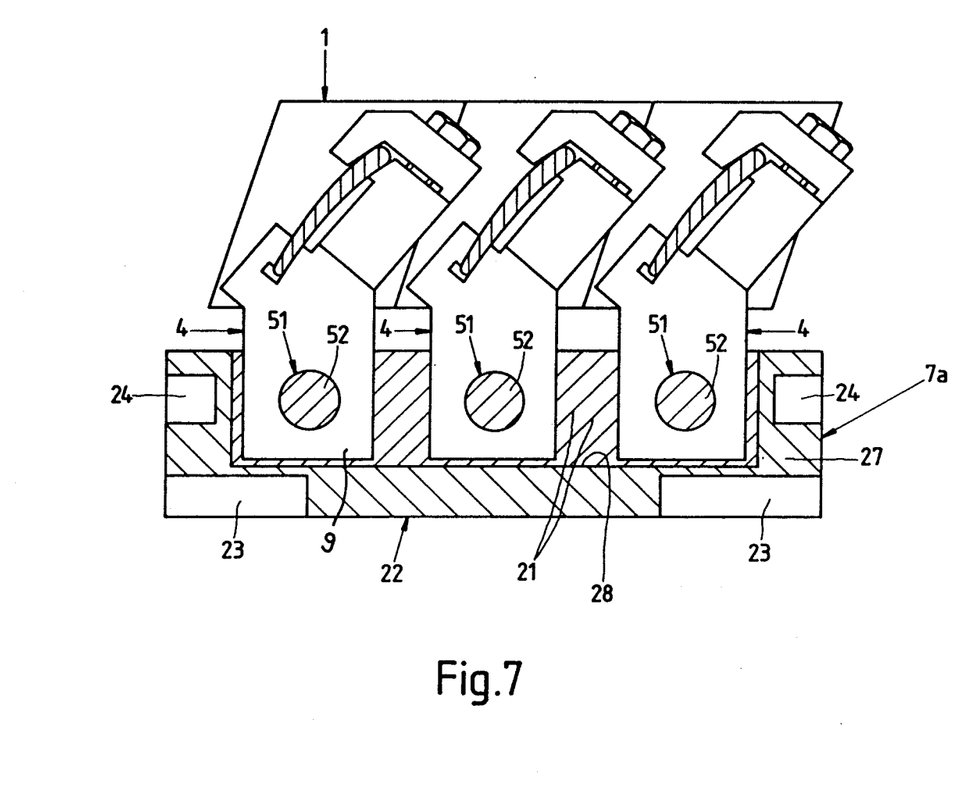
FIG. 7 is a vertical sectional view of a fourth fixture which comprises a prefabricated pallet with a single cavity for the second sections of three work holding elements.

FIG. 7 shows a further fixture which comprises three work holding elements 4 each of which can be identical with the elements 4 shown in FIG. 1, and a modified support having a pallet 7a which is made of steel or other suitable metallic material 27 and is reusable. The pallet 7a has cavity 28 which is large enough to receive the second sections 9 of all three work holding elements 4, and such cavity is filled with casting material 21 which is allowed to harden so as to confine and hold the sections 9 in optimum positions for retention of the parts of the composite workpiece 1 in positions that are necessary for accurate machining in a grinding machine or in another suitable tool. The pallet 7a exhibits the advantage that it is reusable; however, it is necessary to properly maintain and, if necessary, refinish its mounting surfaces including the supporting surface 22 and the surfaces bounding the recesses 23. In other words, it is necessary to properly maintain the shape of the reusable pallet 7a in contrast to the dispensable pallets 7 of FIGS. 1, 4 and 5. The outline of the steel pallet 7a of FIG. 7 can correspond to that of the pallet 7 shown in FIG. 1, 4 or 5. This means that such reusable pallet 7a can be installed in the same machine tool as the non-reusable pallets 7.

Figure 8:
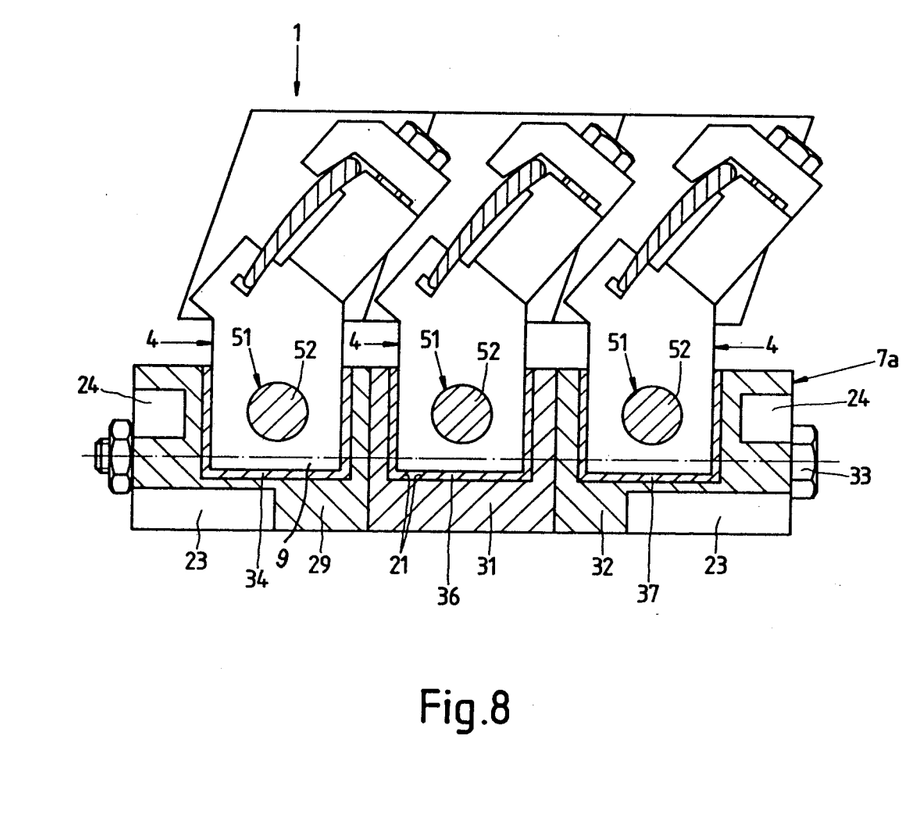
FIG. 8 is a similar vertical sectional view of a fifth fixture which constitutes a first modification of the fixture of FIG. 7 and comprises a modular pallet.

FIG. 8 shows a fixture which constitutes a first modification of the fixture of FIG. 7. It comprises a reusable pallet 7a which is assembled of three separable parts or modules 29, 31, 32 held together by one or more bolts and nuts 33 or by analogous means for separably connecting the modules to each other. Each of the modules 29, 31, 32 defines a discrete mold cavity 34, 36, 37 for the second section 9 of the respective work holding element 4, and such cavities are filled with casting material 21 which hardens and forms envelopes serving to securely anchor the respective second sections 9 in the modules 29, 31, 33 of the reusable pallet 7a. This pallet exhibits the advantage that it allows for a more convenient removal of work holding elements 4 from the respective modules 29, 31, 32 because such modules can be taken apart by removing the connecting means 33, either before or after the parts of the composite workpiece 1 are separated from the respective retaining means. The retaining means can be identical with those shown in FIGS. 1-3.

Figure 9:
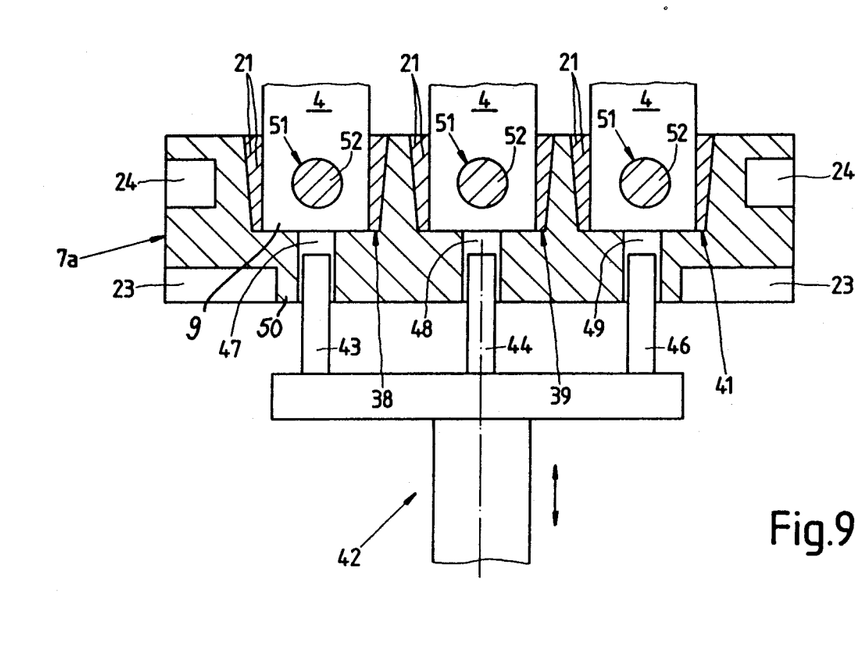
FIG. 9 is a vertical sectional view of a fixture which constitutes a second modifications of the fixture of FIG. 7 and wherein the pallet has conical mold cavities for casting material and for the second sections of three work holding elements, and further showing a device which serves to expel the second sections of work holding elements from the respective cavities of the pallet.

FIG. 9 shows a second modification of the reusable pallet 7a of FIG. 7. This pallet has three discrete frustoconical mold cavities 38, 39, 41 each of which receives the lower or second section 9 of the respective work holding element 4 as well as a mass of hardened casting material 21 which ensures that the work holding elements are properly retained in the pallet 7a during treatment of the respective workpieces (not shown). The bottom wall 50 of the reusable pallet 7a of FIG. 9 has three holes 47, 48, 49 which communicate with the respective cavities 38, 39, 41 are receive portions of reciprocable expelling elements in the form of rams 43, 44, 46 forming part of a suitable expelling device 42. Such device can be reciprocated by a fluid-operated motor (not shown) so as to expel the second sections 9 of the holding elements 4 from the respective cavities 38, 39, 41 upon completion of treatment of the corresponding workpiece parts. The conical shape of the cavities 38, 39, 41 contributes to the ability of rams 43, 44, 46 to expel the second sections 9 as well as the masses of hardened casting material 21 from such cavities when the treatment of the workpiece parts is completed.

Each of FIGS. 1, 5, 7, 8, 9 and 10 shows that the second sections 9 or 9a of the work holding elements 4 can be provided with means for enlarging the areas of contact with the casting material 21. Such means are in the form of transversely extending bores or holes 51 which are provided in the second sections 9 or 9a and are filled with molten casting material 21 during pouring of such material into the respective cavities. When the material hardens, it forms rods 52 which even more reliably hold the second sections 9 or 9a of the elements 4 in the one-piece or composite pallet 7 or 7a. Referring, for example to FIG. 9, the rod-like portions 52 of hardened casting material 21 are integral with hardened casting material which fills the conical cavities 38, 39, 41 around the respective second sections 9 so as to further reduce the likelihood of any movability of holding elements 4 relative to the pallet during transport of the pallet 2 of from the machine tool as well as during treatment of workpiece parts in the machine tool.

The manner of assembling the workpiece parts 1a, 1b, 1c with the respective holding elements 4 is preferably as follows: In the first step, the workpiece parts are connected with the retaining means of the respective first sections 8 of the corresponding work holding elements 4. In the next step, the workpiece 1 and the work holding elements 4 are properly positioned with reference to the mold or form 53 (see FIG. 10) prior to pouring of casting material 21 which is to form the entire support or certain portions of the support. When the pouring of molten casting material 21 is completed, the material is allowed to harden or set to thereby fix the holding elements 4 in proper positions for retention of the workpiece 1 in an optimum position for treatment by the toll or tools of the grinding machine or another machine tool. When the treatment is completed, the material 21 is molten or the pallet is taken apart or broken up into smaller pieces in order to simplify and facilitate separation of work holding elements 4 from the fragments of the support or separation of treated workpiece parts from the respective work holding elements. As mentioned above, if the liberation of work holding elements 4 involves or necessitates a melting of casting material 21 of the support 6, such melting can take place prior or subsequent to separation of treated parts of the workpiece from the respective work holding elements.

Figure 10:
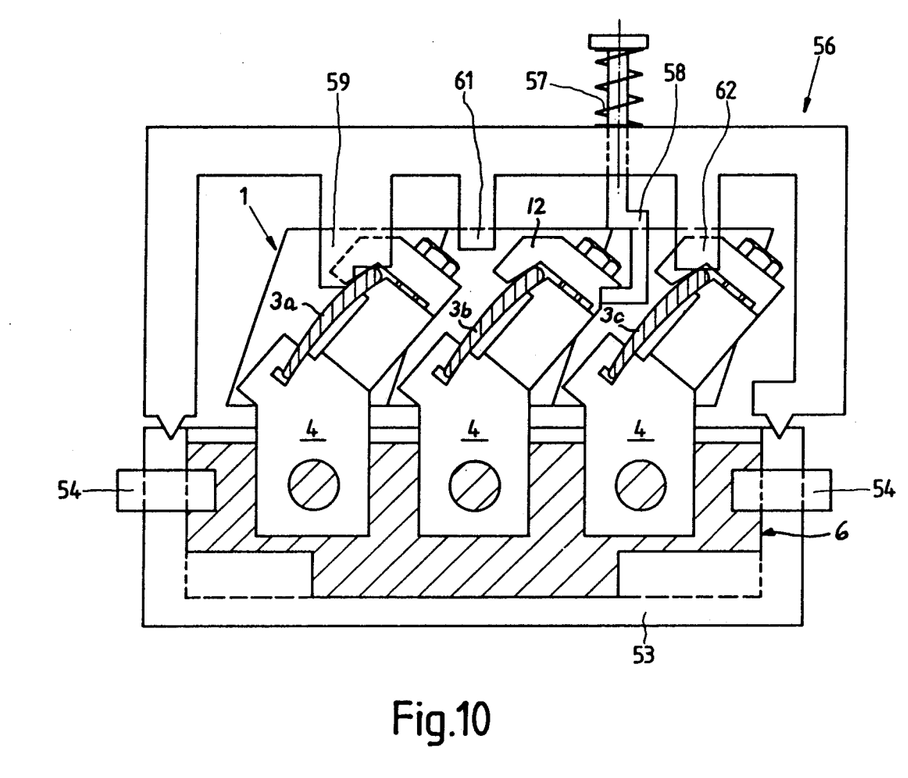
FIG. 10 is a sectional view of a further fixture and of a mold for the making of the fixture as well as of means for locating three workpieces with reference to the respective work holding elements of the fixture.

FIG. 10 further shows a locating device 56 which can be used jointly with the form or mold 53 to properly locate the work holding elements 4 in the cavity of the mold 53 prior to pouring of the casting material 21. The reference characters 54 denote plugs which are inserted into the mold 53 so as to form the aforediscussed recesses 24 for reception of entraining means on suitable conveyor means. The plugs 54 can constitute extractible inserts in the respective walls of the mold 53. The locating device 56 is properly seated on top of the mold 53 and comprises a spring biased clamp 58 (the spring is shown at 57) which engages the claw 12 of the centrally located work holding element 4 and maintains it in a desired position with reference to the mold 53. Downwardly extending arms 59, 61, 62 of the locating device 56 engage selected portions of the workpiece 1 so as to further ensure proper positioning of workpiece parts and work holding elements 4 in the mold 53 during pouring of molten casting material 21. For example, the arm 59 can engage the leftmost blade 3a, the arm 62 can engage the rightmost blade 3c, and the centrally located arm 61 can engage one of the end pieces 2b. FIGS. 1 and 2 shown at 63, 66, and 64 those parts of the workpiece 1 which are engaged by corresponding portions of the locating device 56. Of course, if the locating device is used in conjunction with a composite pallet 7a, it is mounted on such pallet rather than on the mold 53 because the pallet then constitutes a mold for casting material 21.

The casting material can constitute a tin-lead-antimony alloy or any other suitable hardenable casting material. The exact selection of the material which is to confine and retain the sections 9 or 9a of the work holding elements 4 will depend on the desired tolerances and on the dimensions of workpiece parts. For example, it is also possible to employ certain types of synthetic resins, molding sand, gypsum or concrete.

An advantage of the improved fixture is that the parts 1a–1c of the workpiece 1 need come into any, even minimal, contact with the casting material 21. Thus, the treated workpiece 1 need not be cleaned upon separation from the respective work holding element or elements 4 because it is engaged only by the abutments 11a, 11b, by the claw or claws 12 or 12a and by the projections 19, depending on the nature of the selected retaining means. The retaining means can be designed to be maintained in from-locking (as shown) as well as or in force-locking engagement with the respective parts of the workpiece 1. The utilization of retaining means which include at least one elastic portion or component is desirable for the aforediscussed reasons, especially if the nature of the workpiece is such that it should not be positively clamped and locked by unyielding parts of the retaining means. The utilization of springy or elastomeric parts greatly reduces the likelihood of development of excessive edge pressures and/or excessive pressures per unit area of the workpiece. The retaining means which are shown in FIGS. 1 to 4 are especially suitable for proper retention of slender and thin-walled portions of the workpieces, such as the blades 3a–3b of the composite workpiece 1 shown in FIG. 1. The feature which is shown in FIG. 4, namely that portions of the levers 18 are blocked in hardened casting material 21, exhibits the advantage that the position of a workpiece which is held by such levers cannot be changed (with reference to its support) until and unless the hardened casting material 21 is heated or broken into fragments which allow for extraction of the levers 18 from the support.

Another advantage of the improved fixture is attributable to the aforediscussed advantage, i.e., to such design and mounting of the work holding elements 4 that the workpiece cannot be contacted by casting material 21. Therefore, the characteristics of the material of the workpiece cannot be influenced by the casting material regardless of the temperature to which the casting material must be heated prior to pouring into the cavity or cavities of the pallet and regardless of the temperature to which the casting material must be cooled in order to harden or in order to facilitate its comminuting preparatory to liberation of the work holding elements. The workpiece can be properly oriented relative to the pallet or relative to the mold prior to pouring of the casting material and is properly held during pouring and hardening of such material so that its position with reference to the pallet does not deviate from an optimum position which ensures a highly accurate machining of the workpiece in a grinding machine or in another machine tool. The workpiece can be oriented and located at plurality of points (as shown in FIGS. 1, 2 and 10) so as to even further reduce the likelihood of misalignment during embedding of sections 9 or 9a of the work holding elements 4 in casting material. The arrangement is preferably such that the locating device 56, too, is kept out of contact with molten casting material 21; this even further reduces the likelihood of misalignment of the workpiece 1 during completion of the fixture.

A further advantage of the improved fixture, which is also attributable to absence of direct contact between the workpiece or workpieces and casting material, is that the casting operation is very simple and can be completed within a short interval of time. The reason is that it is not necessary to coat or otherwise insulate those portions of the workpiece which are to remain exposed and/or those portions of the workpiece which are to be engaged by the retaining means because the retaining means do not adhere to the workpiece in contrast to many types of casting material which are used in conventional fixtures wherein the casting material comes in actual contact with the workpiece. Thus, it is not necessary to employ complex seals which are a must in conventional fixtures and serve to shield from casting material those parts of a workpiece which are to remain exposed and/or which are not to be contacted by molten casting material.

Still another advantage of the improved fixture is that it allows for removal of treated workpieces prior to melting or breaking of hardened casting material. This is due to the fact that the workpiece or workpieces are secured only to the sections 8 of the work holding elements 4 and are secured in such a way that their separation from the respective sections 8 does not necessitate previous melting or breaking of casting material. The possibility of removing the workpiece or workpieces prior to melting of the casting material even further reduces the likelihood of damage to the workpiece or workpieces as a result of direct or indirect contact with molten casting material or with fragments of comminuted casting material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fixture for maintaining workpieces particularly turbine blades - in predetermined positions, comprising a work holding element including a first section having work retaining means and a second section, and a support including hardened casting material in which said second section is at least partially embedded during casting of the support but which is out of contact with said first section.

2. The fixture of claim 1, wherein said support has a plurality of mounting surfaces engageable with a machine in which the workpiece held by said retaining means is to be treated.

3. The fixture of claim 1, wherein said retaining means include a device for clamping the workpiece to the first section of said work holding element.

4. The fixture of claim 1, wherein said retaining means includes means for establishing a form-locking connection between the workpiece and said first section.

5. The fixture of claim 1, wherein said retaining means includes means for establishing a force-locking connection between the workpiece and said first section.

6. The fixture of claim 1, wherein at least a portion of said retaining means is resilient.

7. The fixture of claim 1, further comprising at least one elastic cushion interposed between the retaining means and the workpiece which is being retained thereby.

8. The fixture of claim 1, wherein said retaining means comprises a carrier, at least one abutment on said carrier and means for releasably biasing the workpiece against said abutment.

9. The fixture of claim 8, wherein said retaining means comprises a plurality of abutments and said biasing means comprises at least one mobile claw provided on said carrier and arranged to urge a workpiece against said abutments.

10. The fixture of claim 1, wherein said retaining means comprises a claw, spring-biased lever means for urging said claw against the workpiece on said first section, and auxiliary work retaining means provided on said lever means.

11. The fixture of claim 10, wherein said lever means comprises a plurality of discrete levers and said auxiliary retaining means comprises projections on said levers.

12. The fixture of claim 10, wherein a portion of said lever means is fixedly embedded in the casting material of said support.

13. The fixture of claim 1, wherein said support includes a pallet and further comprising at least one additional work holding element having a first section with work retaining means and a second section embedded in said pallet.

14. The fixture of claim 13, wherein the entire pallet consists of casting material.

15. The fixture of claim 13, wherein said pallet includes a weakened portion intermediate said holding elements so that it is readily breakable into discrete parts each supporting a holding element.

16. The fixture of claim 13, wherein said pallet has a cavity for the second sections of said work holding elements and said casting material is disposed in said cavity.

17. The fixture of claim 13, wherein said pallet includes a plurality of separable reusable parts and each of said parts has at least one cavity for the second section of a holding element, said pallet further comprising means for separably connecting said parts to each other.

18. The fixture of claim 13, wherein said pallet has discrete conical cavities for the second sections of said work holding elements, and further comprising means for expelling casting material and the second sections of said work holding elements from the respective cavities.

19. The fixture of claim 18, wherein said pallet includes a wall adjacent said cavities and having holes communicating with said cavities, said expelling means including reciprocable expelling members in said holes.

20. The fixture of claim 1, wherein said support comprises motion receiving means engageable by a conveyor which serves to transport the fixture along a predetermined path.

21. The fixture of claim 1, wherein said second section includes means for enlarging its area of contact with casting material of said support.

22. The fixture of claim 21, wherein said enlarging means comprises at least one through hole in said second section.

23. The fixture of claim 1, further comprising means for locating a workpiece with reference to said retaining means prior to hardening of said casting material.

24. The fixture of claim 23, wherein said locating means includes means for maintaining a plurality of selected portions of a workpiece in predetermined positions with reference to said first section prior to engagement of the thus located workpiece by said retaining means.

* * * * *